H. KOPPERS.
GAS FURNACE OR COKE OVEN.
APPLICATION FILED JAN. 10, 1908.

901,351.

Patented Oct. 20, 1908.
3 SHEETS—SHEET 1.

H. KOPPERS.
GAS FURNACE OR COKE OVEN.
APPLICATION FILED JAN. 10, 1908.

901,351.

Patented Oct. 20, 1908.
3 SHEETS—SHEET 2.

Witnesses:
Arthur E. Zumpe
N. R. Schulz

Inventor:
Heinrich Koppers
By Frank v. Briesen Atty.

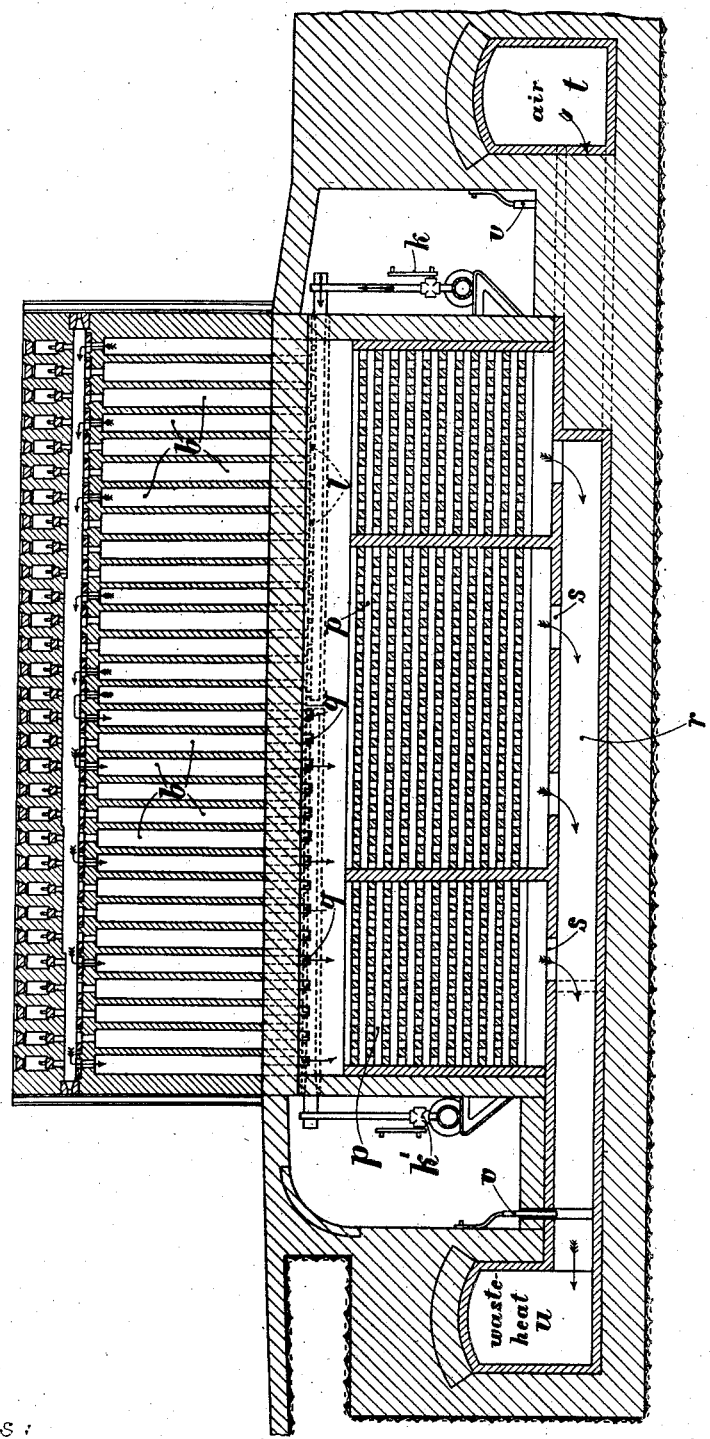

UNITED STATES PATENT OFFICE.

HEINRICH KOPPERS, OF ESSEN-ON-THE-RUHR, GERMANY.

GAS-FURNACE OR COKE-OVEN.

No. 901,351.   Specification of Letters Patent.   Patented Oct. 20, 1908.

Application filed January 10, 1908. Serial No. 410,100.

*To all whom it may concern:*

Be it known that I, HEINRICH KOPPERS, a citizen of the German Empire, and resident of 30 Isenbergstrasse, Essen-on-the-Ruhr, Germany, have invented certain new and useful Improvements in or Relating to Gas-Furnaces or Coke-Ovens, of which the following is a specification.

This invention refers to coke furnaces with reversible draft and alternating heating of the separate halves of the walls and is for the purpose of effecting a constant and uniform giving off of heat to the furnace chambers, whereby the arrangement and working within the various heating walls remains the same; but the heating walls belonging to a furnace are so connected up that the gas currents in them always flow in opposite directions. Consequently in the section the supply of heat to the first half of the length of the furnace chamber is effected from the right and to the second half from the left; on changing the direction of the draft these conditions are simply reversed. Owing to the slight breadth of the furnace as compared with its length there results a complete interchange of heat along the same owing to conduction in the charge, thus assuring the complete uniformity of the heating in each section.

Figure 1:
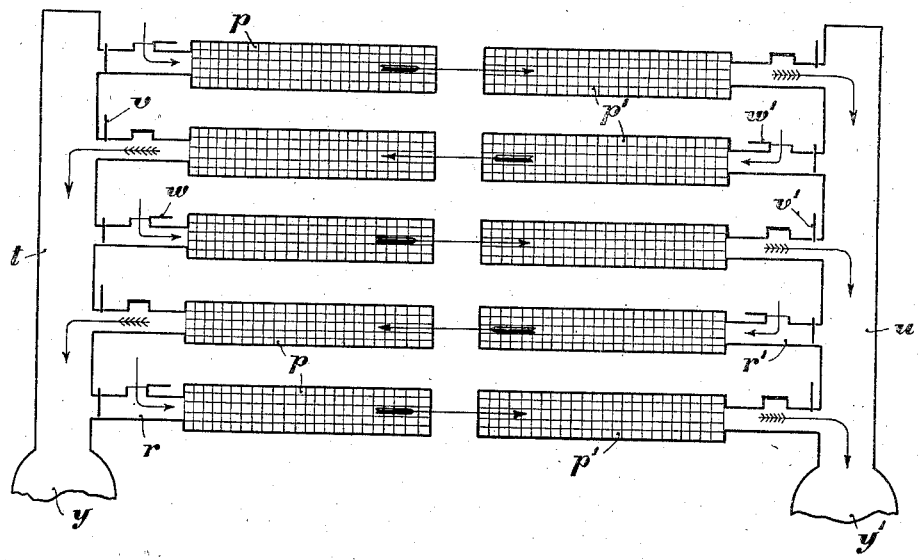
Figure 2:
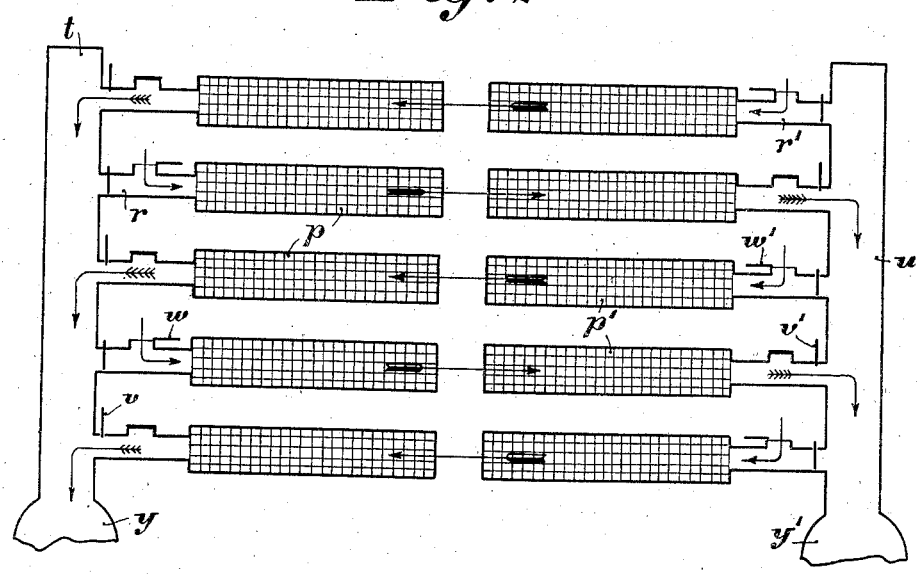
Figure 3:
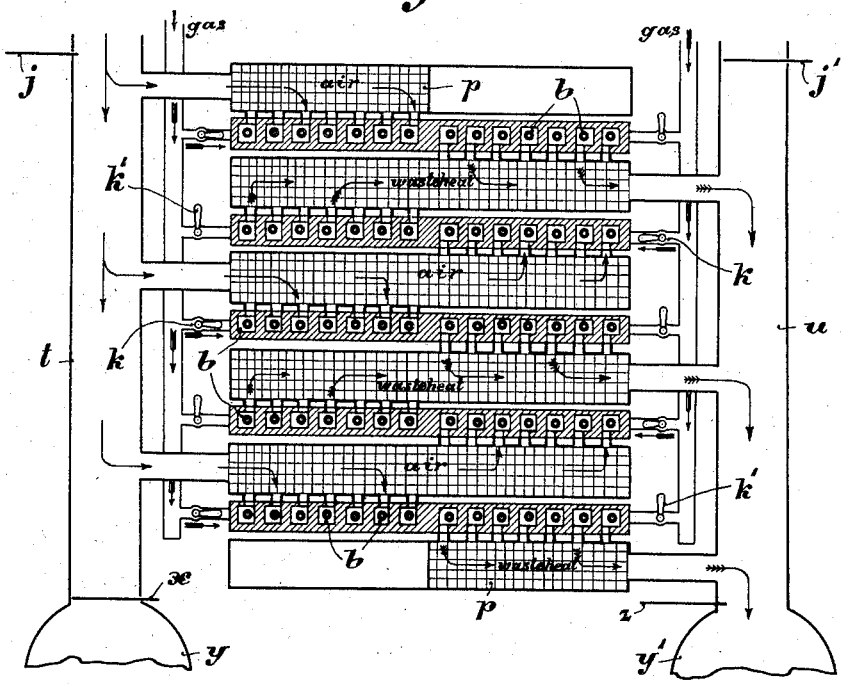
Figure 4:
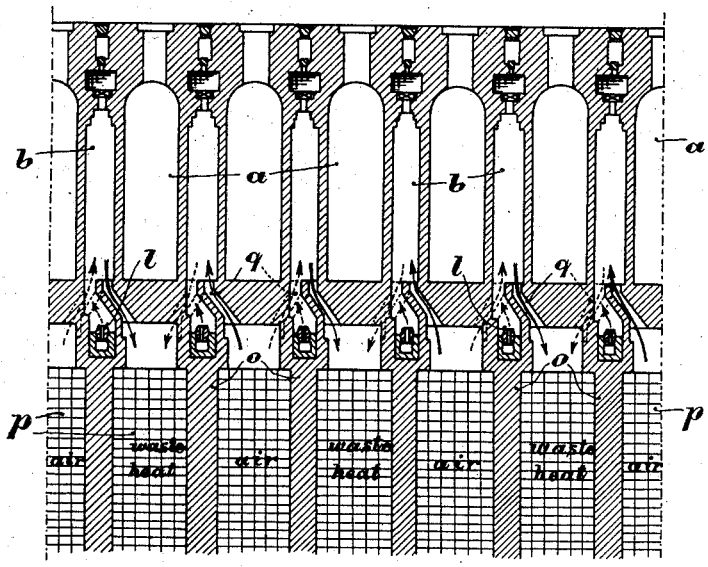

I shall now describe my invention with reference to the accompanying drawings in which Figure 1 is a diagrammatic plan view of the arrangement of the regenerators according to the U. S. Patent No. 818033 for the preliminary heating of air constructed according to the invention referred to, and shows the position of the slides and dampers before reversing. Fig. 2 shows the same after reversing has taken place. Fig. 3 is a diagrammatic plan of the modification with a somewhat altered arrangement of the regenerators. Fig. 4 is a cross section through a battery of coke furnaces. Fig. 5 shows the corresponding constructive arrangement in longitudinal section through the furnace.

The regenerators are divided into two equal halves $p$ and $p'$ which have their outlet on both sides through channels $r$ and $r'$ into the collecting conduits $t$ and $u$ running along the front of the series of regenerators and communicating with the chimneys $y$ and $y'$. The channels $r$ and $r'$ can be shut off from the collecting conduits $t$ and $u$ by slides $v$ and $v'$, whereas the air can enter the regenerators through slides $w$ and $w'$. Now the slides $v$ of the regenerator $p$ and the slides $w'$ of the regenerator $p'$ are alternately shut while the slides $w$ of $p$ and the slides $v'$ of $p'$ are alternately open. Thus in the first series of regenerators (Fig. 1) the air passes into the one half of the heating walls, supposed to be connected in parallel directly with the regenerators, there it is burned with the gas supplied apart and after passing over into the other half of the heating walls flows into the regenerator $p'$ and through channel $r'$ and conduit $u$ into the chimney. The direction of the current in the second series of regenerators is the very opposite so that the desired distribution of heating is effected. By a suitable alteration of all slides and dampers, which can be simply effected by coupling them up in groups, all the current directions are reversed (Fig. 2). The heating of the furnace chambers, however, is in no-wise varied; as, according to the standpoint laid down above, the displacement of the combustion zone from the right side of the furnace chamber to the left side and vice versa is of no importance.

The following is the arrangement according to Figs. 3—5;—The regenerators $p$ run along beneath the coke chambers $a$, are nogged with lattice-work of fire-proof bricks and are separated from each other by walls $o$. The regenerators always communicate with the adjoining walls $b$ through the air supply passages $q$, so that the regenerator situated to the right of the heating wall $b$ communicates with the first group of the heating flues and the regenerator situated to the left with the other group. The channel $r$ beneath each regenerator $p$ communicates with the latter through openings $s$ whose clear sections, distributed either uniformly or in accordance with a definite law, taken together give the necessary cross section for assuring a uniform exhaust of the smoke gases as well as a uniform distribution of the air along the whole length of the regenerator. Any cross walls built into the regenerator $p$ for constructive reasons or for regulating the supply are of no importance as regards the individual working of the regenerator along the whole length of the furnace. The channels $r$ alternately have their outlet into the main conduit $t$ on the one side and $u$ on the other, from which they can be throttled off by regulating the slides $v$.

The method of working is as follows:—
The gas passes to both sides through the constantly open gas pipes by means of the open cocks $k$ and nozzles $l$ into the heating flues and is there burned with the air which enters the regenerator $p$ through the open damper $j$ and also passes into the heating flues through the passages $q$; but the conduit $t$ is shut off from the chimney $y$ by the damper $x$. The exhaust gases fall down into the heating flues of the other side, pass through the second regenerator $p$ and from there into the conduit $u$ which communicates with the chimney $y'$ through the open damper $z$; but in the heating wall situated next to it the current is in the opposite direction.

The reversing of the direction of the drafts is effected in regular alteration by closing the dampers $z$ and $j$ and opening the dampers $x$ and $j'$—the gas cocks $k$ having been previously shut off for purpose of avoiding any loss of gas—and subsequently opening the cocks $k'$.

If it is desired to cut off an individual furnace, this can be directly effected by means of the described slide arrangement with independence of the individual furnaces obtained by longitudinal division walls in the regenerator. If such walls are not present the cutting off of the various furnaces can be effected by closing the slide suitably arranged in the heating flues for regulating the draft or by shutting off the passages $q$.

What I claim is:

In a coke oven, a series of heating chambers, and coking chambers intermediate the heating chambers, combined with a series of regenerators below and parallel to the heating chambers, and means for causing the heating gases to flow in opposite directions in adjoining heating chambers, substantially as specified.

In witness whereof I have hereunto set my hand in presence of two witnesses.

HEINRICH KOPPERS.

Witnesses:
W. R. SCHULZ,
FRANK V. BRIESEN.